(12) United States Patent
Linde et al.

(10) Patent No.: US 9,609,805 B2
(45) Date of Patent: Apr. 4, 2017

(54) FOLDING AUGER ASSEMBLY FOR AN AGRICULTURAL HARVESTER

(71) Applicant: CNH Industrial America LLC, New Holland, PA (US)

(72) Inventors: Cooper W. Linde, Lancaster, PA (US); Jason D. Schuster, Grand Island, NE (US); Denver R. Yoder, Manheim, PA (US)

(73) Assignee: CNH Industrial America LLC, New Holland, PA (US)

( * ) Notice: Subject to any disclaimer, the term of this patent is extended or adjusted under 35 U.S.C. 154(b) by 8 days.

(21) Appl. No.: 14/403,880

(22) PCT Filed: May 22, 2013

(86) PCT No.: PCT/US2013/042151
§ 371 (c)(1),
(2) Date: Nov. 25, 2014

(87) PCT Pub. No.: WO2013/181031
PCT Pub. Date: Dec. 5, 2013

(65) Prior Publication Data
US 2015/0139765 A1    May 21, 2015

Related U.S. Application Data

(60) Provisional application No. 61/689,075, filed on May 29, 2012.

(51) Int. Cl.
*A01D 41/12* (2006.01)
*A01F 12/46* (2006.01)
*B65G 33/14* (2006.01)

(52) U.S. Cl.
CPC .......... *A01D 41/1217* (2013.01); *A01F 12/46* (2013.01); *B65G 33/14* (2013.01)

(58) Field of Classification Search
CPC ............. A01D 43/73; A01F 12/46; B60P 1/40
USPC .................................. 414/526, 523
See application file for complete search history.

(56) References Cited

U.S. PATENT DOCUMENTS

| | | | |
|---|---|---|---|
| 3,550,793 A * | 12/1970 | Garner | A01D 41/1217 198/632 |
| 3,584,732 A | 6/1971 | Richardson et al. | |
| 3,638,816 A * | 2/1972 | Mann | B65G 41/002 414/504 |
| 3,719,268 A | 3/1973 | Koehnen et al. | |
| 4,103,790 A | 8/1978 | Neufeldt | |

(Continued)

*Primary Examiner* — Kaitlin Joerger
(74) *Attorney, Agent, or Firm* — Patrick M. Sheldrake

(57) ABSTRACT

An agricultural combine including an agricultural harvester, a crop tank for harvested material, an unloading auger for unloading and discharging crop material. The auger assembly has first and second auger tubes pivotally connected to one another. The auger tubes pivot between a first position in which the auger tubes are coaxial and a second position in which the auger tubes form one of at least two angles. A first link is pivotally connected to the first auger tube and a second link pivotally connected to the second auger tube. An actuator is connected to one of the auger tubes and to one of the links, with the first and second links being pivotally interconnected at one of two positions to maintain the auger tubes in both auger tube positions without loading the actuator.

16 Claims, 4 Drawing Sheets

(56) References Cited

U.S. PATENT DOCUMENTS

| | | | | |
|---|---|---|---|---|
| 4,591,432 | A * | 5/1986 | Hartl | B07B 1/005 |
| | | | | 198/313 |
| 4,846,621 | A * | 7/1989 | Warsaw | B65G 33/32 |
| | | | | 198/313 |
| 4,923,358 | A | 5/1990 | Van Mill | |
| 5,013,208 | A * | 5/1991 | Grieshop | B60P 1/40 |
| | | | | 414/519 |
| 6,119,847 | A * | 9/2000 | Mooney | B65G 33/32 |
| | | | | 198/313 |
| 6,261,050 | B1 * | 7/2001 | Kuhns | B60P 1/42 |
| | | | | 198/671 |
| 7,494,409 | B2 | 2/2009 | Voss et al. | |
| 8,033,377 | B2 | 10/2011 | Reimer et al. | |
| 8,047,757 | B1 * | 11/2011 | Wood | B60P 1/42 |
| | | | | 198/668 |
| 8,167,527 | B2 * | 5/2012 | Kinzenbaw | B60P 1/42 |
| | | | | 414/523 |
| 9,039,340 | B2 * | 5/2015 | Van Mill | B60P 1/42 |
| | | | | 414/526 |
| 2004/0184905 | A1 * | 9/2004 | Kinzenbaw | B60P 1/42 |
| | | | | 414/526 |
| 2007/0172338 | A1 * | 7/2007 | Reimer | A01D 43/073 |
| | | | | 414/339 |
| 2007/0264112 | A1 | 11/2007 | Francis et al. | |
| 2010/0209223 | A1 | 8/2010 | Van Mill et al. | |
| 2012/0315112 | A1 * | 12/2012 | Redekop | B60D 1/167 |
| | | | | 414/21 |

* cited by examiner though exemplifying, in
FOLDING AUGER ASSEMBLY FOR AN AGRICULTURAL HARVESTER This application is the US National Stage filing of International Application Serial No. PCT/US2013/042151 filed on May 22, 2013 which claims priority to U.S. Provisional Application No. 61/689,075 filed May 29, 2012, each of which is incorporated herein by reference in its entirety.

BACKGROUND OF THE INVENTION

1. Field of the Invention

The present invention relates to agricultural harvesters such as combines, and, more particularly, to auger assemblies used in such combines.

2. Description of the Related Art

An agricultural harvester known as a "combine" is historically termed as such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Typical unloading systems for combines involve unloading augers that are formed from first and second tubes with rotatable augers inside that can be actuated to move grain longitudinally through the tubes. The tubes are pivoted to the combine so that they may be displaced laterally relative to the movement of the combine to an unload position in which grain is deposited in a wagon or other vehicle for transport. When the unloading function is completed, the auger tubes are retracted to a fold position in which the first auger tube is generally parallel to the longitudinal axis of the combine and the second auger tube is bent to an angle so that its free end is maintained within the overall configuration of the combine.

The auger tubes are displaced between the fold and unload position by actuators, one of which is on the first tube connected to the combine and the other to swing the second auger tube to its unload position. The construction of the mechanism for translating the movement of the actuator to the load and unload position typically involves an over center configuration in which the load is taken off the actuator when the tubes are in the fold or unload positions. Because it is frequently necessary to employ auger tubes of different lengths, the fold angle is different depending upon the length of the tubes. With current actuation systems, the need to employ multiple angles results in a mechanism that does not take the load off the actuators all potential fold positions.

Accordingly what is needed in the art is an auger tube assembly in which the load is maintained off the actuator in multiple positions.

SUMMARY OF THE INVENTION

The present invention provides a mechanism for auger tube assemblies that maintains the auger tube actuator in an unloaded condition for multiple angles.

The invention, in one form, is an auger assembly having first and second auger tubes each having a longitudinal axis and pivotally connected to one another. The auger tubes are pivotal between a first position in which the auger tubes are coaxial and a second position in which the auger tubes form one of at least two angles. A linkage interconnects and is pivotally mounted to the first and second auger tubes and is spaced from the pivotal interconnection of the auger tubes. The linkage includes a first link pivotally connected to the first auger tube and a second link pivotally connected to the second auger tube. An actuator is connected to one of the auger tubes and to one of the links, with the first and second links being pivotally interconnectable at one of two positions to maintain the auger tubes in one of the first and second auger tube positions without loading the actuator.

The invention, in another form, is an agricultural combine with an agricultural harvester and a crop tank for harvested material. An unloading auger is provided for unloading and discharging crop material with the auger assembly including first and second auger tubes, each having a longitudinal axis and pivotally connected to one another with the auger tubes pivotal between a first position in which the auger tubes are coaxial and a second position in which the auger tubes form one of at least two angles. A linkage interconnects and pivotally mounts to the first and second auger tubes and is spaced from the pivotal interconnection. The linkage includes a first link pivotally connected to the first auger tube and a second link pivotally connected to the second auger tube. An actuator is connected to one of the auger tubes and to one of the links, with the first and second links being pivotally interconnectable at one of two positions to maintain the auger tubes in one of first and second auger tube positions without loading the actuator.

An advantage of the present invention is that the actuator for the auger tubes is unloaded in the first and second positions for each of the angles to increase actuator life.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The term "grain' is used principally throughout this specification for convenience but it is to be understood that this term is not intended to be limiting. Thus "grain" refers to that part of the crop material which is threshed and separated from the discardable part of the crop material. Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
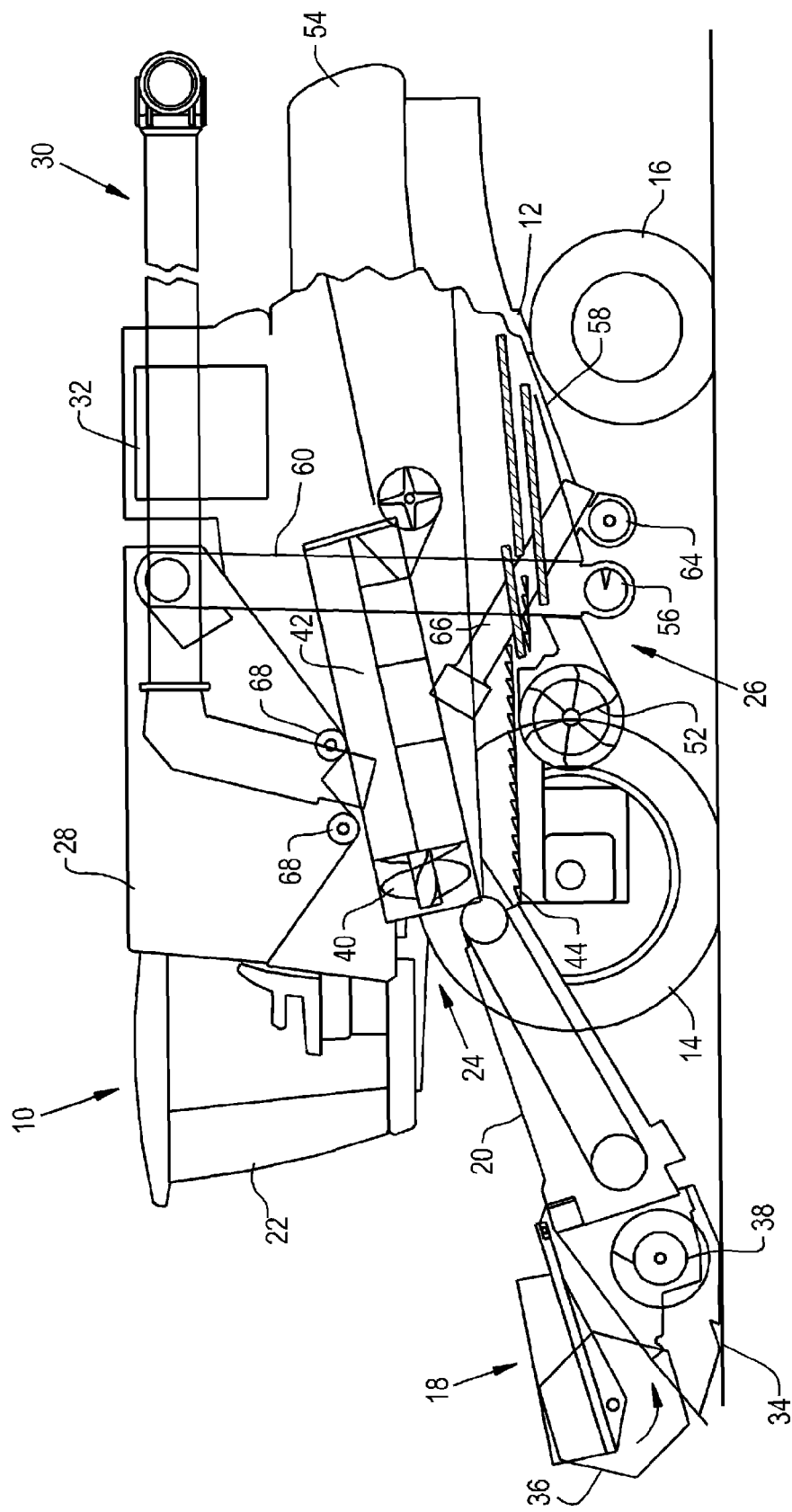
FIG. 1 is a side view of an embodiment of an agricultural harvester in the form of a combine which may include a cleaning system of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger assembly 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is s selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26 including sieves 46, 48 and 50. Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. A pair of grain tank augers 68 at the bottom of grain tank 28 convey the clean grain laterally within grain tank 28 to unloading auger assembly 30 for discharge from combine 10.

Figure 2:
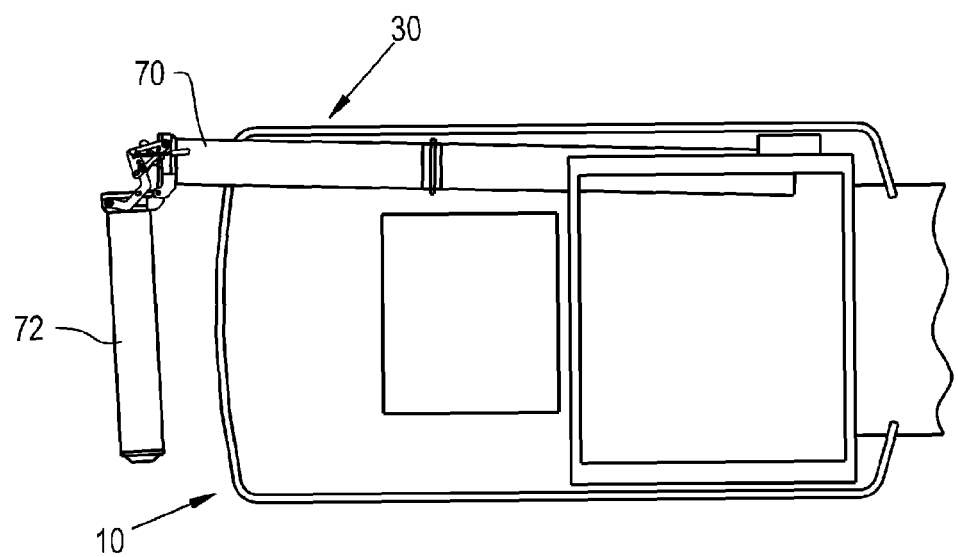
FIG. 2 is a plan view of one form of the agricultural harvester of FIG. 1.
Figure 3:
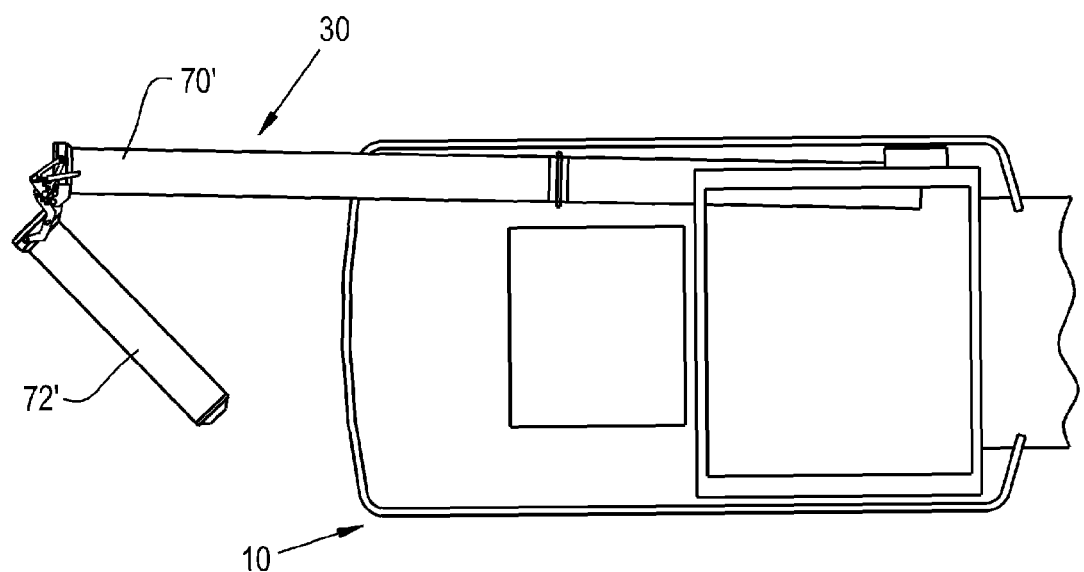
FIG. 3 is a plan view of another form of the agricultural harvester of FIG. 1.

Referring to FIGS. 2 and 3, unloading auger assembly 30 is formed from a first auger tube 70 pivotally connected to combine 10 to receive grain from grain tank 28. Auger tube 70 has a longitudinally extending auger (not shown) to convey crop material along the axis of tube 70. Auger tube 70 is pivotally connected to a second auger tube 72 by a mechanism to be described in detail below. The arrangement of first and second auger tubes 70 and 72 in FIG. 2 shows the auger assembly 30 in a position known as the fold position in which first auger tube 70 extends along side the combine 10 and second auger tube 72 is folded to be maintained within the width of the combine 10. As shown in FIG. 2, the angle made between the first and second auger tubes 70 and 72 is 95° but other angles close to a right angle may be employed. There are instances, however, in which the angle of the tubes in the fold position would not be accommodated by the width of the combine 10 as in the auger tubes shown in FIG. 3.

In FIG. 3, auger tubes 70' and 72' are designated with prime to distinguish them from the auger tubes 70 and 72 of FIG. 2. In the embodiment shown in FIG. 3, auger tube 70' is significantly extended beyond the length of combine 10 and in this case it is necessary for the second auger tube 72' to be maintained in a fold position that is significantly beyond an angle close to a right angle. This is necessary to maintain the second auger tube 72' well within the width of the combine 10 to provide clearance for the auger tubes in the fold position.

Figure 4:
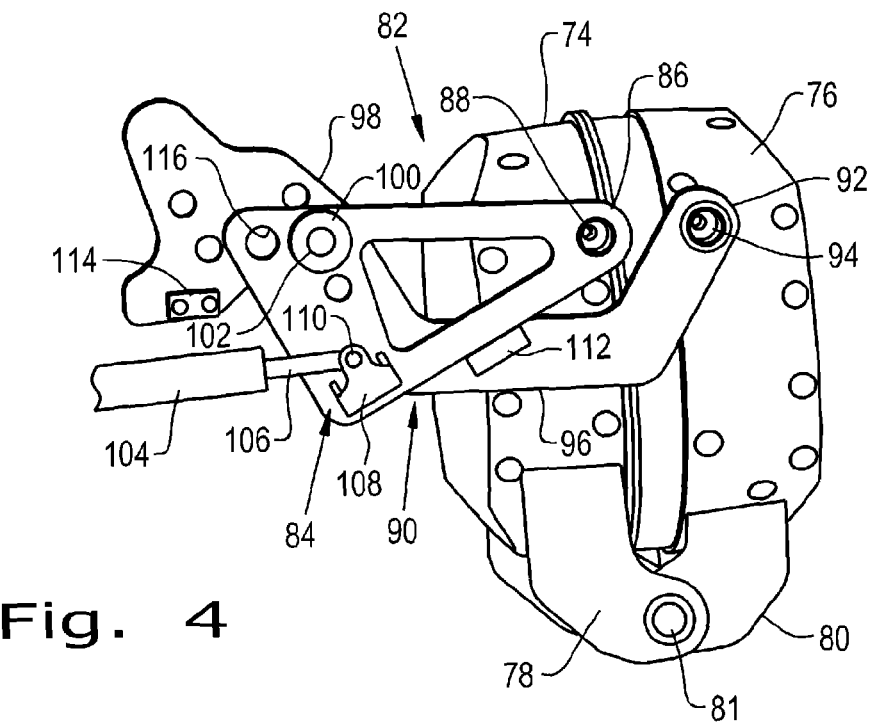
FIG. 4 is a partial plan view of the form of the agricultural harvester of FIG. 2 in a first position.
Figure 5:
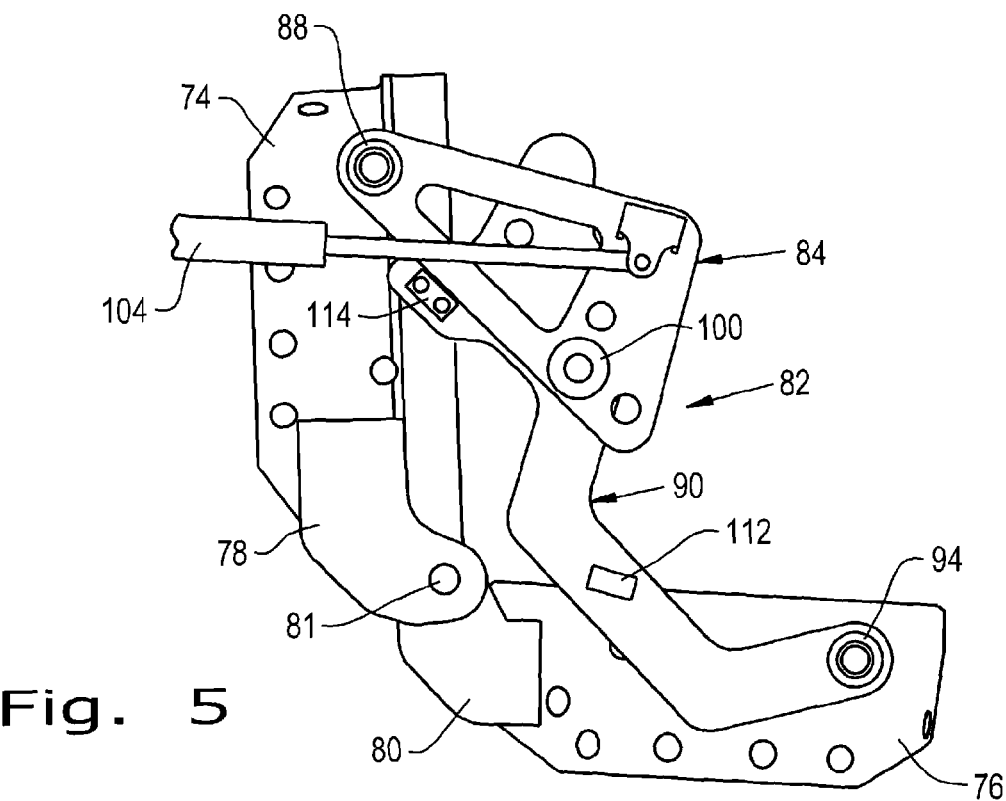
FIG. 5 is a partial plan view of the form of the agricultural harvester of FIG. 2 in a second position.
Figure 6:
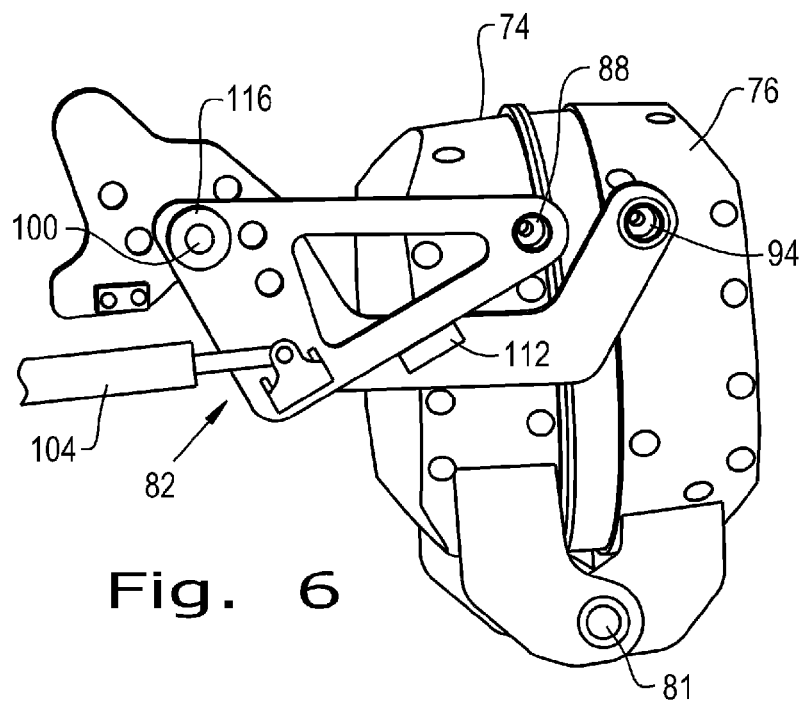
FIG. 6 is a partial plan view of the form of the agricultural harvester of FIG. 3 in a first position.
Figure 7:
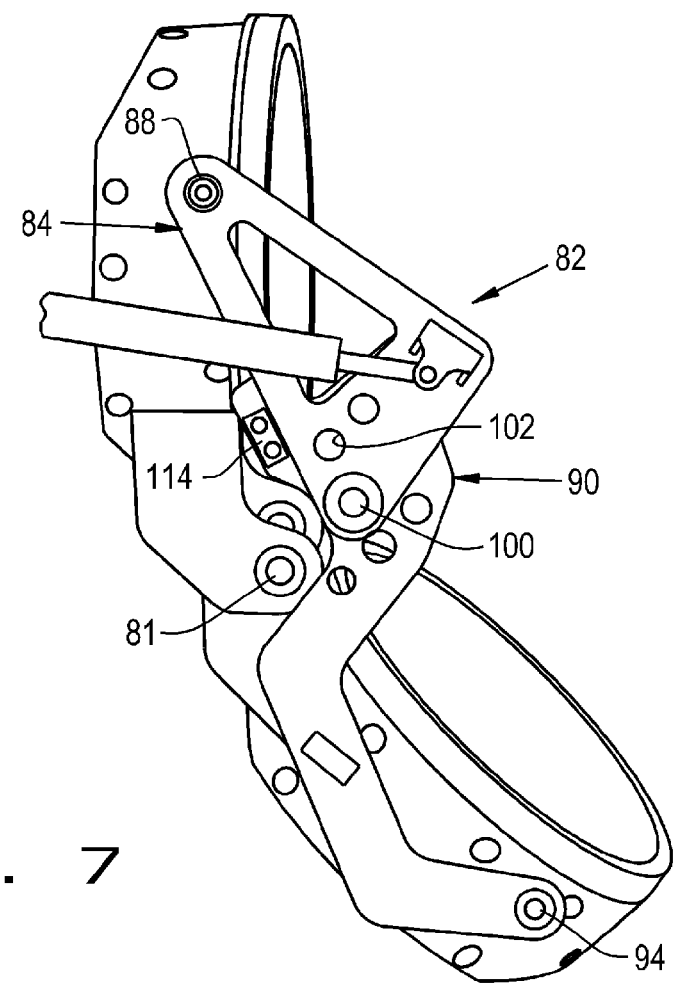
FIG. 7 is a partial plan view of the form of the agricultural harvester of FIG. 3 in a second position.

The auger tubes are in the fold position, except when crop material is being discharged, in which case the auger tubes 70 and 72 and 70' and 72' are pivoted to be coaxial for discharging grain and the auger assembly is pivoted to a position generally laterally from the combine 10. FIGS. 4 and 5 show the specific mechanism for the first and second auger tubes 70 and 72 of FIG. 2. FIGS. 6 and 7 show the mechanism for the auger tubes 70' and 72' of FIG. 3.

In prior art implementations of folding auger tubes, it has been necessary to fabricate special linkage equipment to accommodate the differing angular fold positions. In accordance with the present invention, the mechanisms described in FIGS. 5-7 enable implementation of the different angles while at the same time maintaining any actuator mechanism for the pivoting in an unloaded condition during the fold and unload positions.

Referring now to FIGS. 4 and 5, there is shown a plan view of the mechanism to pivot the first and second auger tubes. The views in FIGS. 4 and 5 are plan views looking up from the bottom of the combine 10. The mechanism is placed in this position to avoid vertical clearance issues. The auger tubes 70 and 72 each come with end sections 74 and 76 respectively. The end sections 74 and 76 are appropriately connected to elongated tubes in which the augers are positioned. For purposes of this discussion, the end sections 74 and 76 will be deemed the first and second auger tubes. End sections 74 and 76 each have plates 78 and 80 which are pivotally interconnected at the junction between end sections 74 and 76 by a pin 81. Duplicate plates are found on the other side of the view.

The end sections 74 and 76 are positioned between two positions, the first of which is shown in FIG. 4. In this position, the auger tubes 70 and 72 are coaxial and provide a path for crop material to be unloaded from the combine 10. This is known as the harvest position and in FIG. 5 the end sections 74 and 76 are pivoted to a 95° angle between the end faces in what is known as the fold position. The end plates 74 and 76 are displaced between the first and second positions by a linkage mechanism 82 incorporating an over center feature as discussed below.

The linkage mechanism 82 includes a first link 84 having, as shown, a triangular shape with one point of the triangle 86 being pivotally connected to end section 74 by means of pin 88. The linkage assembly also includes a second link 90 having one end section 92 pivotally connected to end section 76 by a pin 94. Both pins 88 and 94 are spaced from the pin 81 forming the pivotal joint between end sections 74 and 76. As illustrated, link 90 is shown in somewhat of a shallow u-shaped configuration with a section 96 integral with the end section 92 and connected to a further section 98. A pin 100 is insertable in a first hole 102 in link 84 and connects with a corresponding hole in section 98 of link 90. Pin 100 is fashioned so that it may be removed and inserted as needed.

The links 84 and 90 are pivoted by an actuator 104 having a cylinder connected to first tube 70 at an appropriate location which is not shown. The actuator 104 has a longitudinally displaceable actuating rod 106 pivotally connected to first link 84 at a bracket 108 through pin 110. The links 84 and 90 are displaced between the positions shown and FIG. 4 and in FIG. 5 by extending the actuator rod 106 from its retracted position shown in FIG. 4 to its extended position shown in FIG. 5. As set forth in further detail below, the linkage assembly 82 provides an over center arrangement for the actuator 104 in both the first position shown in FIG. 4 and the second position shown in FIG. 5. A stop 112 on link 90 provides an abutment for the linkage in the position of FIG. 4 and a stop 114 also on linkage 90 provides an abutment for first link 84 in the position of FIG. 5. Referring to FIG. 5 an imaginary line drawn between the pin 88 and 94 shows that pin 100 is near a line between the two and is set up so that the linkage must cause pin 100 to pass through that line when it is moved back to the position shown in FIG. 4. Because of this arrangement the load is essentially taken off of the actuator 104 in the unload position of FIG. 4 and the fold position of FIG. 5. The actuator 104 is subject to loads when the mechanism is displacing the auger tubes between those positions but this occurs for only a brief period of its operating cycle. With a lessening of the loads on the actuator 104 its service life may be significantly extended.

As mentioned above, the auger tubes may be in the form shown in 70' and 72' in which the 95° angle illustrated in FIG. 5 does not permit adequate clearance of the auger tubes in the fold position. To accommodate this, a different angle, namely the 135° shown in FIGS. 6 and 7, is utilized. The first link 84 is provided with an additional hole 116 into which the pin 100 may be inserted to enable an over center relationship for the greater angle of 135° to be maintained and eliminate the load on actuator 104.

FIGS. 6 and 7 are identified with the same part numbers as in FIGS. 4 and 5 so that if an imaginary line is drawn between pin 94 and pin 88, the pin 100 will fall near a line extending between the two but in a relationship that causes the pin 100 to move through the line as the actuator pivots it to the fold position of FIG. 7. In the position of FIG. 7, the over center relationship is also maintained as shown by a line extending between pin 88 and 94 that the pin 100 is near the line but must pass through the line as the first link 84 is displaced from the stop 114.

The arrangements set forth above enable the use of a single set of hardware to provide variable sets of angles for the auger tubes. By simply positioning the pin 100 in either hole 102 or 116, the different auger tube lengths can be accommodated. The positioning of the pin 100 may be done when the equipment is manufactured or may be done easily in the field as later desired. Although specific fold angles have been disclosed, it should be apparent that other fold angles may also be accommodated and still maintain the over center relationship.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An auger assembly, comprising:
    first and second auger tubes each having a longitudinal axis and pivotally connected to one another, said auger tubes pivotal between first position in which said auger tubes are coaxial and a second position in which the auger tubes form one of at least two angles;
    a linkage interconnecting and pivotally mounted to said first and second auger tubes and spaced from the pivotal interconnection of said auger tubes, said linkage including a first link pivotally connected to said first auger tube and a second link pivotally connected to said second auger tube and wherein said first link has at least two holes connectable to said second link, and
    an actuator connected to one of said auger tubes and to one of said links, said first and second links being pivotally interconnectable at one of at least two positions to maintain said auger tubes in one of said first and second auger tube positions without loading said actuator;
    a pin insertable in one of said at least two holes, wherein when the first link is connected to the second link with the pin inserted in the second hole the angle of displacement between the first position and the second position is greater than when the first link is connected to the second link with the pin inserted in the first hole.

2. The auger assembly of claim 1, wherein said linkage maintains said at least first and second auger tubes in an over center position in both of said at least first and second positions.

3. An auger assembly, comprising:
    first and second auger tubes each having a longitudinal axis and pivotally connected to one another, said auger tubes pivotal between first position in which said auger tubes are coaxial and a second position in which the auger tubes form one of at least two angles;
    a linkage interconnecting and pivotally, mounted to said first and second auger tubes and spaced from the pivotal interconnection of said auger tubes said linkage including a first link pivotally connected to said first auger tube and a second link pivotally connected to said second auger, and
    an actuator connected to one of said auger tubes and to one of said links, said first and second links being pivotally interconnectable at one of at least two positions to maintain said au er tubes in one of said first and second auger tube positions without loading said actuator;
    wherein said linkage maintains said at least first and second auger tubes in an over center position in both of said at least first and second positions;
    wherein said first link has at least two holes connectable to said second link and said assembly further comprises a pin insertable in one of said at least two holes, wherein when the first link is connected to the second link with the pin inserted in the second hole the angle of displacement between the first position and the second position is greater than when the first link is connected to the second link with the pin inserted in the first hole.

4. The auger assembly of claim 1, wherein the position of said pin in the first and second positions of said auger tubes is close to a line extending between the pivotal connection of side linkage at the first auger tube and the pivotal connection of said linkage at said second auger tube.

5. The auger assembly of claim 4, wherein said pin is displaced through the line extending between said pivotal connections.

6. The auger assembly of claim 5, further comprising stops on said second link against which said first link abuts when said auger tubes are in each of the first and second positions.

7. The auger assembly of claim 6, wherein said first link is triangular and said openings are spaced from one another adjacent one side of said triangular link.

8. An agricultural combine comprising:
   an agricultural harvester;
   a crop tank for harvested material;
   an unloading auger assembly for unloading and discharging crop material, said auger assembly comprising:
   first and second auger tubes each having a longitudinal axis and pivotally connected to one another, said auger tubes pivotal between a first position in which said auger tubes are coaxial and a second position in which the auger tubes form one of at least two angles;
   a linkage interconnecting and pivotally mounted to said first and second auger tubes and spaced from the pivotal interconnection of said auger tubes, said linkage including a first link pivotally connected to said first auger tube and a second link pivotally connected to said second auger tube wherein said first link has at least two holes connectable to said second link, and
   an actuator connected to one of said auger tubes and to one of said links, said first and second links being pivotally interconnected able at one of at least two positions to maintain said auger tubes in one of said at least first and second auger tube positions without loading said actuator; and
   a pin insertable in one of said at least two holes, wherein when the first link is connected to the second link with the pin inserted in the second hole the angle of displacement between the first position and the second position is greater than when the first link is connected to the second link with the pin inserted in the first hole.

9. The agricultural combine of claim 8, wherein said linkage maintains said first and second auger tubes in an over center position in both of said first and second positions.

10. The agricultural combine of claim 8, wherein the position of said pin in the first and second positions of said auger tubes is close to a line extending between the pivotal connection of said linkage at the first auger tube and the pivotal connection of said linkage at said second auger tube.

11. The agricultural combine of claim 10, wherein said pin is displaced through the line extending between said pivotal connections.

12. The agricultural combine of claim 11, further comprising stops on said second link against which said first link abuts when said auger tubes are in each of the first and second positions.

13. The agricultural combine of claim 12, wherein said first link is triangular and said openings are spaced from one another adjacent one side of said triangular link.

14. The agricultural combine of claim 8, wherein said linkage is positioned underneath said auger tubes.

15. The agricultural combine of claim 8, wherein the auger tubes have different links.

16. The agricultural combine of claim 8, wherein one of said links is in the form of a right triangle with the holes for interconnecting said links spaced from one another along the hypotenuse of the triangle.

* * * * *